G. CIAPETTI.
METHOD AND APPARATUS FOR PRODUCING DEALCOHOLIZED FERMENTED BEVERAGES.
APPLICATION FILED MAY 8, 1912.
1,243,811.
Patented Oct. 23, 1917.
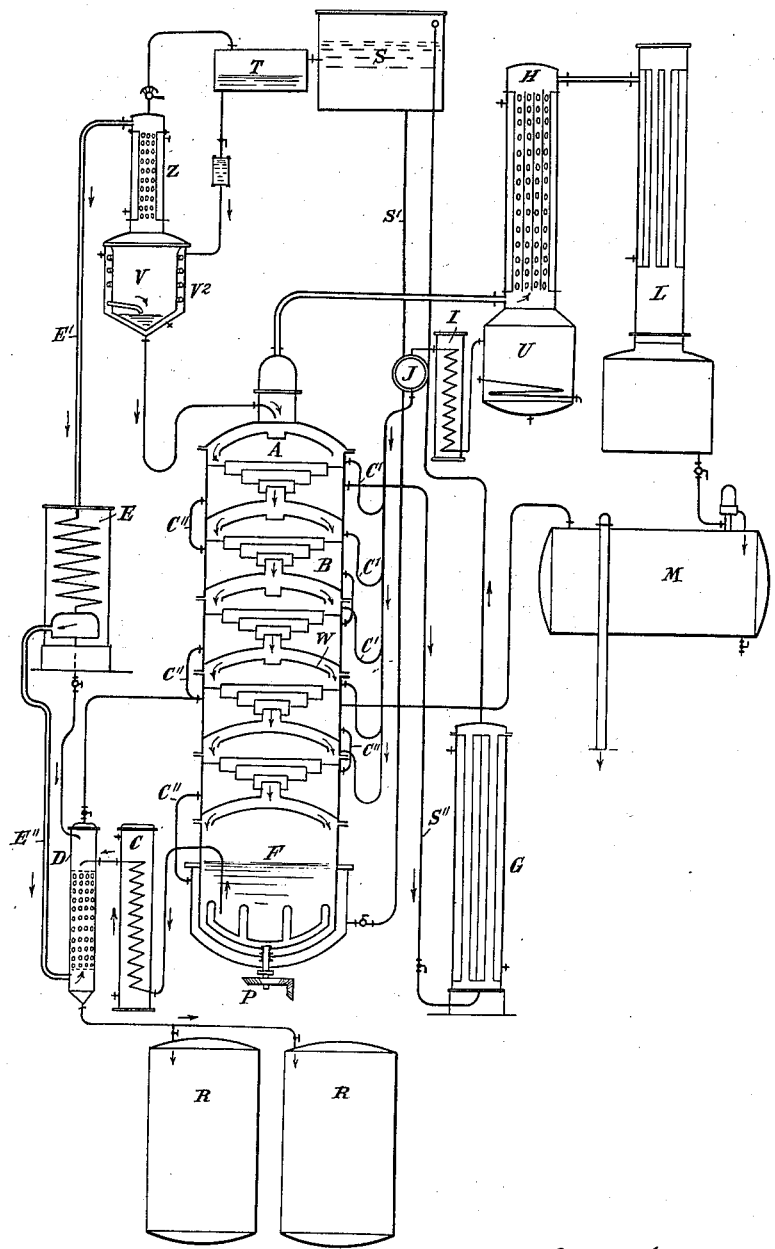

UNITED STATES PATENT OFFICE.

GINO CIAPETTI, OF ROME, ITALY.

METHOD AND APPARATUS FOR PRODUCING DEALCOHOLIZED FERMENTED BEVERAGES.

1,243,811.  Specification of Letters Patent.  Patented Oct. 23, 1917.

Application filed May 8, 1912. Serial No. 695,987.

*To all whom it may concern:*

Be it known that I, GINO CIAPETTI, a subject of the King of Italy, residing at Rome, Italy, have invented certain new and useful Improvements in Methods and Apparatus for Producing Dealcoholized Fermented Beverages, of which the following is a specification.

My present invention has for its object to provide an improved apparatus for continuously de-alcoholizing wine, beer and other fermented liquids, keeping the said de-alcoholized substances otherwise intact and unaltered and at the same time recovering the alcohol in a condition of the highest concentration and purity, my said improved apparatus having the advantage of permitting the wine or other alcoholic liquid to be automatically fed to the apparatus when working, and of discharging the alcohol and de-alcoholized products therefrom under the same conditions, the wines and other de-alcoholized substances keeping all their qualities intact, such as flavor, color and original chemical composition, except that the alcohol is separated therefrom by the devices which will now be described.

The apparatus may be heated to a predetermined and absolutely constant temperature by introducing into the heating spaces suitable liquids of known boiling point.

The said bath permits the circulation and automatic reintegration of the liquid therein which may be heated from the outside or by steam according to the working capacity of the apparatus.

In the accompanying drawing a preferred form of apparatus is shown in elevation partly in section for carrying my process into practice.

The apparatus shown in Figure 1 comprises a column A containing a series of wine exhausting cups B—B each of which may be heated by a liquid or a steam bath, the liquid of the bath being adapted to circulate from one cup to the other by tubes C″. Each cup is surmounted by a metallic condensing disk W acting as a dephlegmator of alcoholic vapors generated in each of the said cups; C′ C′ are return tubes which restore the de-alcoholized phlegms separated during the operation, and cool the upper surface of disk W thus producing the dephlegmation.

The column A may be made of a suitable acid-resisting material. At F on the bottom of column A a mechanical stirrer P is placed to facilitate the exhaustion of the alcohol contained in the wine. The temperature of the liquid bath at the bottom F of column A may be controlled by a steam coil entering through 3.

The wine from the distributer T is admitted to the small apparatus V, said admission being controlled by a graduated cock K. The liquid passes through the coil 3 which is externally heated by a liquid or steam bath thereby being heated to the temperature necessary for the development of the flavored ethers and the gases. While in chamber V the vaporization takes place, and in column Z the ethers are separated from the accompanying alcoholic products. The ethers are condensed in cooler E whence they pass to the emulsifier D where they again meet with the cold de-alcoholized wine from column A and cooler C. The wine deprived of ethers and gases is admitted to column A where it passes through the long channels of the stepwise arranged cups B—B, distributed in a thin film upon the same, and is there deprived of its alcohol, the vapors of which rise through the column, whereupon the wine is collected in the bottom part F, thence flowing continuously into the cooler G, and then to the emulsifier D from which it may be discharged by cocks 1 and 2 and alternately collected in tanks R—R, the one filling while the other is being discharged as one or the other may be suitably cut off from the remaining part of the apparatus.

By this arrangement undue rise of pressure in the interior of the apparatus and consequent rise of temperature beyond $62\frac{1}{2}°$ centigrade is prevented so that the wine remains intact and cannot take up extraneous flavors.

The generated hydro-alcoholic vapors pass to the small dephlegmator column H where they are suitably concentrated, the products of condensation being collected in a boiler U containing a steam-coil for heating the liquid to boiling temperature and depriving it of any residual alcohol. The condensed water passes to the refrigerator I, and thence to the distributer J from which it flows, by means of regulation cocks —y— and is returned to the column where it assists in concentrating the alcoholic vapors generated by the cups by being distributed on lenticular dephlegmating plates W above each of the said cups. The concentrated alcoholic vapors then pass to the column L where they are condensed, whereupon they are collected in reservoir M and may then be concentrated in the ordinary manner.

O is a vacuum pump connected to a safety vessel or catch vessel P, for maintaining a uniform degree of vacuum throughout the whole apparatus.

What I claim is:—

1. In the manufacture of low alcohol beverages, the process consisting of flowing the beverage which has been previously deprived of the major portion of its ethers and gases over a succession of heated surfaces in a thin film to drive off a portion of the alcohol with a portion of the water, separating the portion of alcohol from the water driven off therewith, cooling the water and reintroducing the water into the beverage in separate portions, one immediately after the beverage has passed each heated surface, to maintain the volume substantially constant and to assist in maintaining a low temperature.

2. In the manufacture of low alcohol beverages, the process consisting of flowing the beverage which has been previously deprived of the major portion of its ethers and gases over a succession of heated surfaces in a thin film to drive off a portion of the alcohol with a portion of the water, separating the portion of alcohol from the water driven off therewith, cooling the water and reintroducing the water into the beverage in separate portions, one immediately after the beverage has passed each heated surface, to maintain the volume substantially constant and to assist in the maintaining of a low temperature.

In testimony whereof I have signed my name to this specification in the presence of two subscribing witnesses.

GINO CIAPETTI.

Witnesses:
 DUILIO NARDONI,
 NICOLA SISTO.